United States Patent
Lee

(10) Patent No.: US 7,987,324 B2
(45) Date of Patent: Jul. 26, 2011

(54) APPARATUS AND METHOD FOR VERIFYING UPDATE DATA IN MOBILE COMMUNICATION SYSTEM

(75) Inventor: Sung-Chan Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 771 days.

(21) Appl. No.: 11/874,658

(22) Filed: Oct. 18, 2007

(65) Prior Publication Data
US 2008/0114946 A1    May 15, 2008

(30) Foreign Application Priority Data
Nov. 14, 2006  (KR) .................. 10-2006-0112057

(51) Int. Cl.
G06F 12/00 (2006.01)
G06F 13/00 (2006.01)
G06F 13/28 (2006.01)

(52) U.S. Cl. ...................................................... 711/154
(58) Field of Classification Search .................. None
See application file for complete search history.

(56) References Cited

U.S. PATENT DOCUMENTS

| 4,709,367 A | * | 11/1987 | Grafe et al. ............... 714/769 |
| 5,930,467 A | * | 7/1999 | Morita ................... 358/1.16 |
| 2006/0045466 A1 | | 3/2006 | Sasaki et al. |

FOREIGN PATENT DOCUMENTS

| CN | 1767615 | 5/2006 |
| KR | 1020000056150 | 9/2000 |
| KR | 1020040009097 | 1/2004 |
| KR | 1020050041240 | 5/2005 |

* cited by examiner

Primary Examiner — Kevin L Ellis
Assistant Examiner — Gary W Cygiel
(74) Attorney, Agent, or Firm — The Farrell Law Firm, P.C.

(57) ABSTRACT

Provided is an apparatus and method for searching update data of an external memory. The apparatus includes the detachable external memory, a data management unit, and a controller. The detachable external memory stores a File Allocation Table (FAT) and a plurality of pieces of data. The data management unit updates a first FAT and creates a second FAT having the same information as the first FAT. The controller controls the data management unit to access the requested data, update information on the first FAT, and create the second FAT.

15 Claims, 4 Drawing Sheets

APPARATUS AND METHOD FOR VERIFYING UPDATE DATA IN MOBILE COMMUNICATION SYSTEM

PRIORITY

This application claims priority under 35 U.S.C. §119(a) to an application filed in the Korean Intellectual Property Office on Nov. 14, 2006 and assigned Serial No. 2006-112057, the contents of which are incorporated herein by reference.

BACKGROUND OF THE INVENTION

1. Field of the Invention

The present invention relates generally to an apparatus and method for verifying data of an external memory in a mobile communication system, and in particular, to an apparatus and method for identifying a File Allocation Table (FAT) of an external memory and verifying update data of the external memory in a mobile communication system.

2. Description of the Related Art

In recent years, mobile communication systems, a necessity to modern people, have become widely used. A service provider or a system manufacturer is competitively developing a product (or a service) for the differentiation from other enterprises.

For example, mobile communication systems are evolving into multimedia equipment for phone books, games, short messages, electronic mail (e-mail) messages, morning wakeup calls, MPEG-1 Audio Layer 3 (MP3) players, digital cameras, and wireless Internet services and provide a variety of services.

A mobile communication system can be equipped with an external memory for separately storing data. Thus, the mobile communication system can store a large capacity of data compared to a conventional mobile communication system and shift data to/from other information equipments such as a personal computer using the external memory.

Further, an increasing capacity of the external memory has led to an increasing amount of data stored in the external memory.

However, a user of the mobile communication system must search for a file and check a change of data firsthand in a case where the information equipment deleted data from the external memory or stored data in the external memory.

In order to overcome such a drawback, data information stored in the external memory is stored in the mobile communication system, thereby making it possible to check a change of data.

In other words, the mobile communication system compares data information stored in the external memory with data information stored in the mobile communication system and checks whether there was a change of data stored in the external memory, in a case where the mobile communication system is equipped with the external memory.

However, such a method has a drawback that it can implement only a search about one external memory installable in the mobile communication system, and delays a search time by comparing data information (e.g., a file capacity) stored in a storage unit of the mobile communication system and in the external memory to check the change of data.

Thus, a demand for an apparatus and method for verifying updated data among data stored in the external memory in the mobile communication system exists.

SUMMARY OF THE INVENTION

An aspect of the present invention is to substantially solve at least the above problems and/or disadvantages and to provide at least the advantages below. Accordingly, an aspect of the present invention is to provide an apparatus and method for verifying update data among data stored in an external memory in a mobile communication system.

Another aspect of the present invention is to provide an apparatus and method for checking a File Allocation Table (FAT) of an external memory and verifying update data of the external memory in a mobile communication system.

A further aspect of the present invention is to provide an apparatus and method for verifying update data of an external memory using two FATs in a mobile communication system.

According to one aspect of the present invention, there is provided an apparatus for searching update data of an external memory. The apparatus includes the detachable external memory, a data management unit, and a controller. The detachable external memory stores a File Allocation Table (FAT) and a plurality of pieces of data. The data management unit updates a first FAT, which is an FAT stored in the external memory, and creates a second FAT having the same information as the first FAT, upon accessing the data. The controller controls the data management unit to access the requested data, update information on the first FAT according to the access, and create the second FAT, upon detection of a request for accessing the data.

According to another aspect of the present invention, there is provided a method for verifying update data in a mobile communication system. The method includes accessing data stored in an external memory, and updating a first FAT previously stored in the external memory by information according to the data access; creating and storing a second FAT having the same information as the updated first FAT; upon verifying update data, comparing the first FAT of the external memory with the second FAT; and determining that there is the update data when the first FAT is identical to the second FAT.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

An apparatus and method for verifying update data updated by an information device such as a personal computer or a digital camera, using a File Allocation Table (FAT) in a mobile communication system (terminal) will be described below.

The term update data refers to a modification of data stored in an external memory such as a MultiMedia Card (MMC) and a Secure Digital Card (SDC) or new data stored in the external memory.

The FAT includes a first FAT and a second FAT. The first FAT represents information accessible (e.g., readable and writeable) by both the mobile communication system and the information device. The second FAT represents information accessible (e.g., readable and writeable) only by the mobile communication system.

Figure 1:
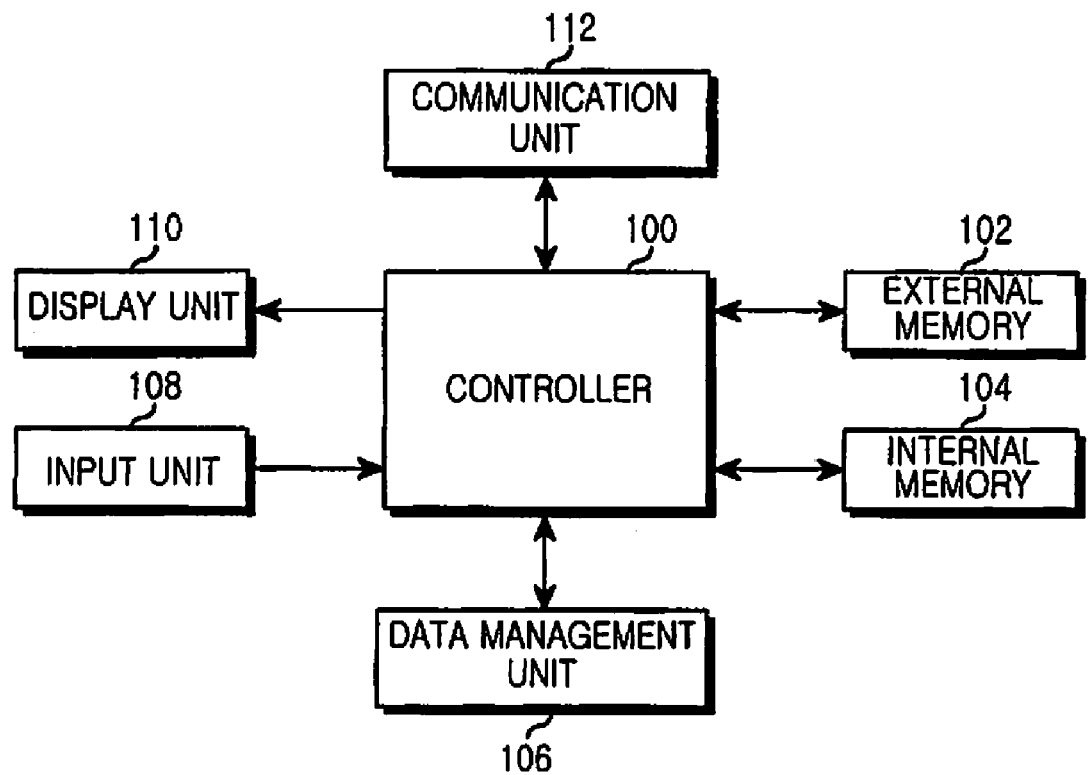
FIG. 1 is a block diagram illustrating architecture of a mobile communication system for verifying update data according to the present invention.

FIG. 1 is a block diagram illustrating architecture of a mobile communication system for verifying update data among data stored in an external memory according to the present invention. In the following description, the mobile communication system (terminal) refers to a cellular phone, a Personal Communication System (PCS) phone, a Personal Digital Assistant (PDA), an International Mobile Telecommunication-2000 (IMT-2000) phone, and a 4th-generation broadband system, for example. The following description will be made using a general construction of the example.

Referring to FIG. 1, the mobile communication system includes a controller 100, an external memory 102, an internal memory 104, a data management unit 106, an input unit 108, a display unit 110, and a communication unit 112.

The controller (a Micro-Processor Unit (MPU)) 100 controls a general operation of the mobile communication system. For example, the controller 100 performs a process and a control for voice communication and data communication. The controller 100 compares a File Allocation Table (FAT) of the external memory 102 and checks whether there is update data among data stored in the external memory 102, when detecting installation of the external memory 102 according to the present invention. The controller 100 outputs a list of the checked update data when checking that there is the update data.

When detecting a request for updating the data stored in the external memory 102 from a user, the controller 100 controls the data management unit 106 to update information on the FAT (a first FAT). After that, the controller 100 controls the data management unit 106 to copy the information on the FAT (the first FAT) and create a second FAT.

The data management unit 106 updates the FAT of the external memory 102 under the control of the controller 100. The data management unit 106 creates the second FAT using the updated FAT under the control of the controller 100.

The external memory 102, a storage medium such as an MMC and an SD card detachable from the mobile communication system, can store a plurality of pieces of data depending on a capacity of the external memory 102. The external memory 102 stores the FAT and the second FAT according to the present invention.

The internal memory 104 includes a Read Only Memory (ROM), a Random Access Memory (RAM), and a flash ROM. The ROM stores a microcode of a program for processing and controlling the controller 100 and all reference data.

The RAM, a working memory of the controller 100, stores temporary data generated in execution of all program. The flash ROM stores all updateable data for safekeeping such as a phone book, an outgoing message, and an incoming message.

The input unit 108 includes numeral key buttons '0' to '9', a menu button, a cancel button (delete), an OK button, a talk button, an end button, an Internet button, navigation key (or direction key) buttons, and a plurality of function keys such as a character input key. The input unit 108 provides key data on a key pressed by a user to the controller 100.

The display unit 110 displays status information generated during execution of the mobile communication system, the limited number of characters, and a large amount of moving pictures and still pictures. The display unit 110 can be a color Liquid Crystal Display (LCD). The display unit 110 can display a list of updated data according to the present invention.

The communication unit 112 exchanges a radio signal of data input/output through an antenna (not shown). For example, in a transmission mode, the communication unit 112 processes data by channel coding, spreading, converts the processed data into a Radio Frequency (RF) signal, and transmits the RF signal. In a reception mode, the communication unit 112 converts a received RF signal into a baseband signal, processes the baseband signal by de-spreading and channel decoding, and restores the processed signal to data.

The controller 100 can perform a function of the data management unit 106. These are separately constructed and shown in the present invention in order to distinguish and describe respective functions. Thus, when a product is actually realized, it can be also constructed for the controller 100 to process all of the functions.

A method for comparing a FAT stored in the external memory 102 and checking a list of update data among data stored in the external memory 102, using the mobile communication system, according to an exemplary embodiment of the present invention will be described below.

Figure 2:
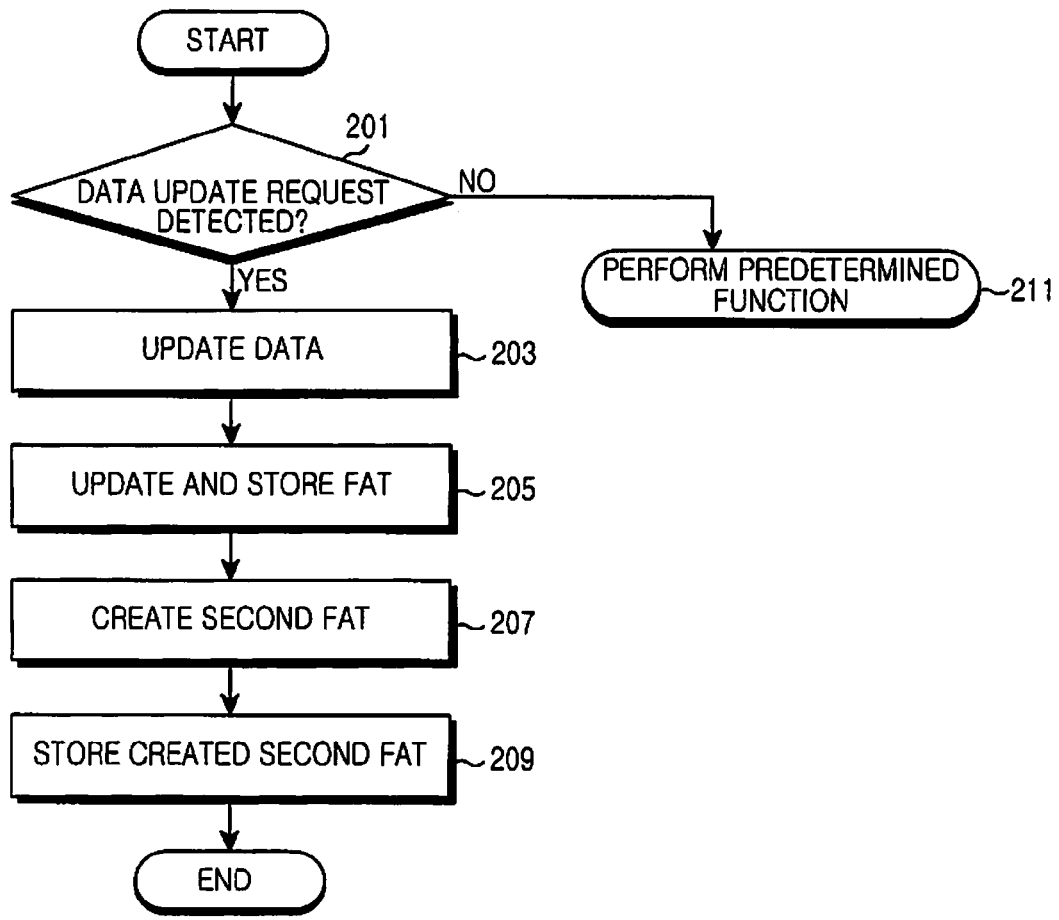
FIG. 2 is a flowchart illustrating a procedure of creating a File Allocation Table (FAT) to verify update data in a mobile communication system according to the present invention.

FIG. 2 is a flowchart illustrating a procedure of creating a FAT to verify update data among data stored in the external memory in the mobile communication system according to the present invention.

Referring to FIG. 2, in Step 201, the controller 100 checks whether it detects a data update request from a user. The data update request, which is a request for updating data of the external memory 102 from a user, represents a request for creating, modifying, or deleting data.

When the controller 100 does not detect the data update request in Step 201, the controller 100 performs a predetermined function (e.g., an idle mode), in Step 211.

Upon detecting the data update request in Step 201, the controller 100 controls the data management unit 106 to update the data in response to the user request, in Step 203. In other words, the controller 100 modifies, deletes, or creates the data of the external memory 102.

In Step 205, the controller 100 controls the data management unit 106 to update a FAT (a first FAT) and store the updated FAT in the external memory 102. The FAT updated by the data management unit 106 will be described with references to Table 1 below.

TABLE 1

| Offset | Length  | Value                                 |
|--------|---------|---------------------------------------|
| 0      | 8 bytes | Name                                  |
| 8      | 3 bytes | Extension                             |
| 11     | byte    | Attribute (OOARSHDV) <br> O: unused bit |

TABLE 1-continued

| Offset | Length | Value |
|---|---|---|
|  |  | A: archive |
|  |  | R: read-only bit |
|  |  | S: system bit |
|  |  | D: directory bit |
|  |  | V: volume bit |
| 22 | Word | Time |
| 24 | Word | Data |
| 26 | Word | Cluster (desc, below) |
| 28 | dWord | File Size |

In Table 1, the FAT is comprised of a total 28 bytes of information, e.g., a file name, a file extension, a file attribute, a file creation time (date), a storage position, and a file size. The FAT is modified every time a file is read and written.

In Step 207, the controller 100 creates a second FAT having the same information as the FAT (the first FAT). The second FAT is created by copying the FAT (the first FAT). The second FAT is updated together with the FAT (the first FAT) every time the data is updated.

However, information equipment other than the mobile communication system updates only the information on the FAT (the first FAT) except the second FAT, when being equipped with the external memory 102 and receiving a request for updating the data.

In Step 209, the controller 100 stores the created second FAT in the external memory 102. The external memory 102 can include a storage medium such as an MMC and an SD card detachable from the mobile communication system. The external memory 102 can store the FAT (the first FAT), the second FAT, and a plurality of pieces of data.

After that, the controller 100 terminates the present process.

Figure 3:
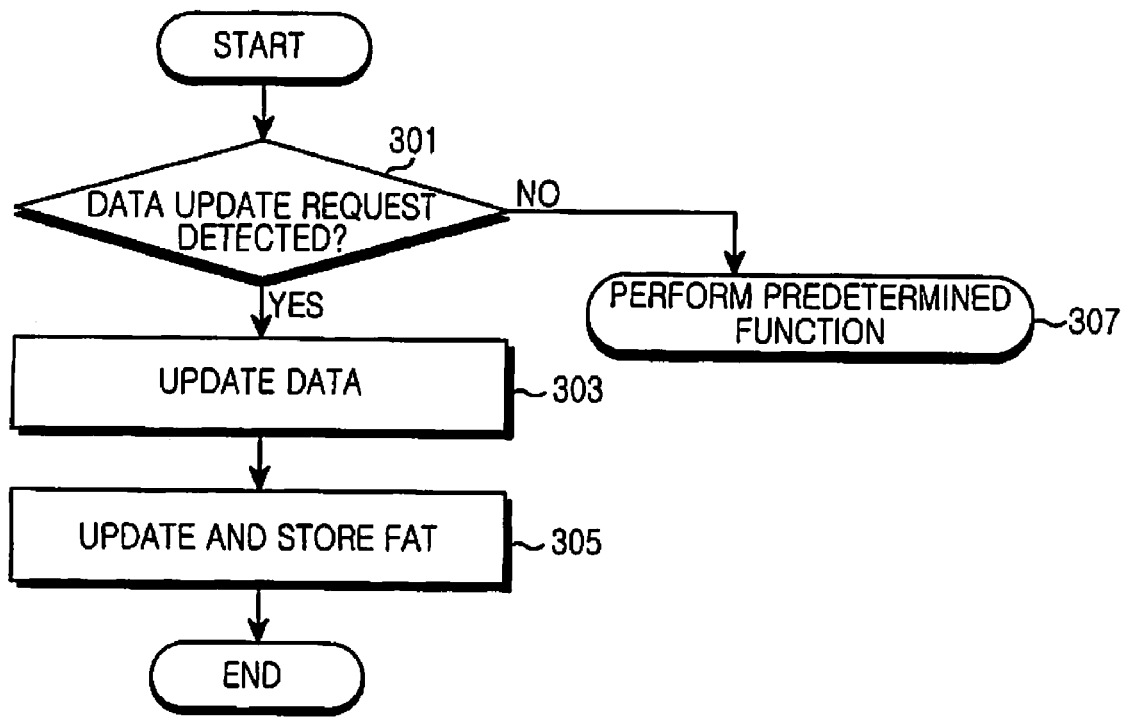
FIG. 3 is a flowchart illustrating a procedure of updating, by information equipment, information on a FAT to check an update data list of an external memory according to the present invention.

FIG. 3 is a flowchart illustrating a procedure of updating, by an information equipment, information on a FAT to check an update data list of the external memory according to the present invention.

Referring to FIG. 3, the information equipment, which is equipment detachable from the external memory other than the mobile communication system, can be a personal computer, a notebook computer, and a digital camera.

In Step 301, a controller of the information equipment (not shown) checks whether the controller detects a request for updating data of the external memory 102 from a user. When the controller does not detect the data update request in Step 301, the controller performs a predetermined function (e.g., an idle mode), in Step 307.

Upon detecting the data update request in Step 301, the controller updates data in response to the user request, in Step 303. In Step 305, the controller updates and stores a FAT (a first FAT).

The information equipment updates only the FAT (the first FAT) because it does not recognize existence of the second FAT.

After that, the controller 100 terminates the present process.

Figure 4:
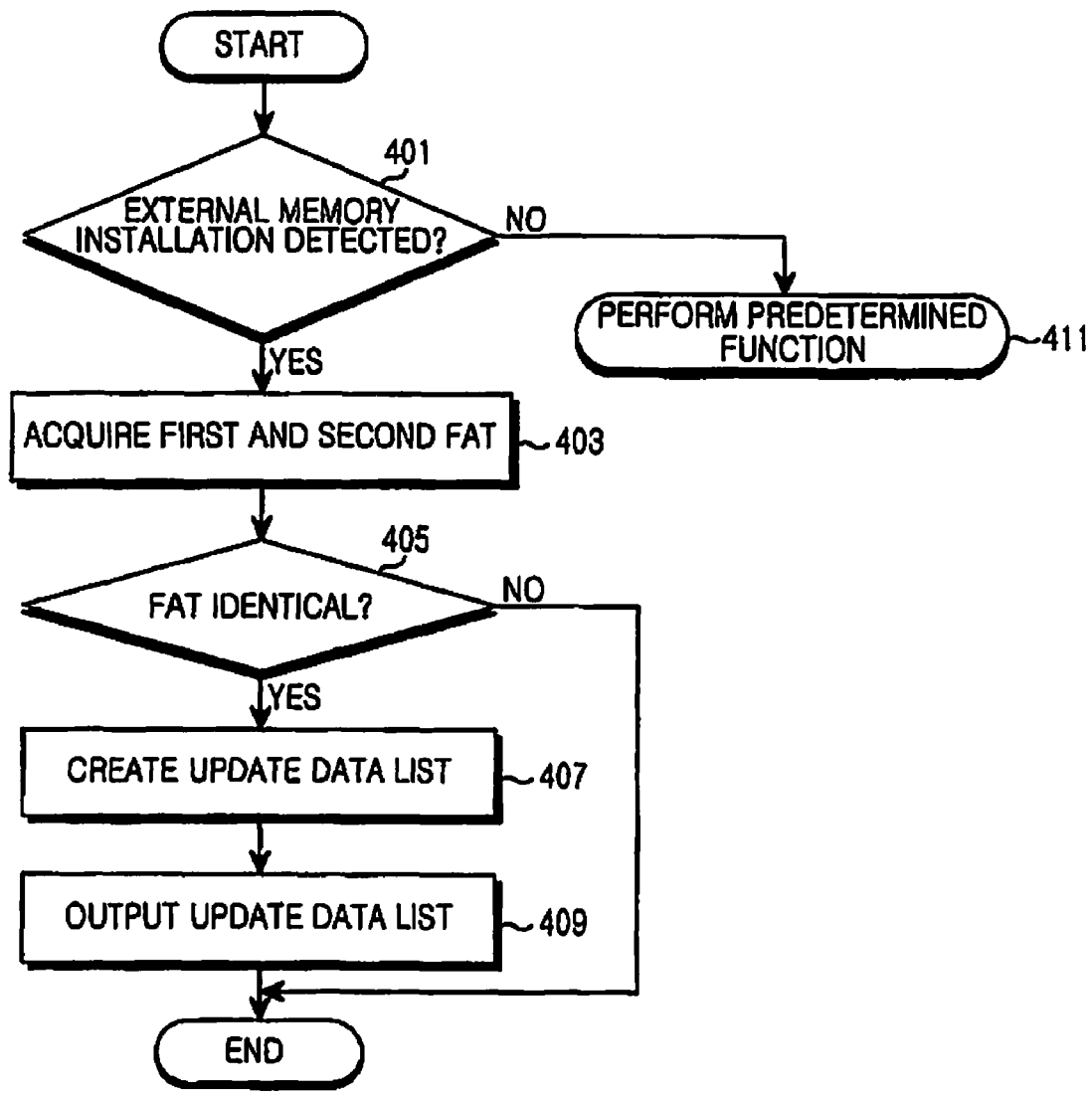
FIG. 4 is a flowchart illustrating a procedure of verifying update data among data stored in an external memory in a mobile communication system according to the present invention.

FIG. 4 is a flowchart illustrating a procedure of verifying update data among data stored in the external memory in the mobile communication system according to the present invention.

Referring to FIG. 4, in Step 401, the controller 100 checks whether the controller 100 detects an installation of the external memory 102. When the controller 100 does not detect the installation of the external memory 102 in Step 401, the controller 100 performs a predetermined function (e.g., an idle mode), in Step 411.

Upon detecting the installation of the external memory 102 in Step 401, the controller 100 acquires a FAT stored in the external memory 102 when detecting the installation of the external memory 102, in Step 403. The FAT acquired by the controller 100 refers to a first FAT updateable by both the mobile communication system and the information equipment and a second FAT updateable only by the mobile communication system.

In Step 405, the controller 100 compares the acquired FAT and checks whether information on the first and second FATs are identical to each other. If the first and second FATs are not identical, the controller 100 terminates the present process.

Upon determining that the information on the first and second FATs are net identical with each other in Step 405, the controller 100 creates an update data list, in Step 407. The update data list represents a list of data updated by installing the external memory 102 in the information equipment. In other words, the update data list is a list of data modified or created in the information equipment.

In Step 409, the controller 100 displays the created update data list on the display unit 110 and then, terminates the present process.

As described above, the apparatus and method for checking the memory of the mobile communication system according to the present invention can separately output a list of data accessible by the information equipment such as a personal computer, thereby enabling a user to easily verify the update data and can reduce a time taken to search the update data by using the FAT, compared to a conventional method for searching update data on a per file basis.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile communication terminal for identifying update data, the terminal comprising:
   a detachable external memory having a first File Allocation Table (FAT) which is accessible by the mobile communication terminal and an information device, and a second FAT which is only accessible by the mobile communication terminal,
   wherein the first FAT and the second FAT are separate data structures stored on the detachable external memory; and
   a controller for updating information in the first FAT and creating the second FAT having the same information as the first FAT.

2. The terminal of claim 1, wherein the update data of the first FAT is created by the information device.

3. The terminal of claim 1, wherein the second FAT is for identifying the update data of the first FAT.

4. The terminal of claim 3, wherein upon detection of a request for accessing the data stored in the external memory, the information device accesses the stored data and updates only the information in the first FAT.

5. The terminal of claim 1, wherein upon detecting an installation of the external memory, the controller acquires the first FAT and the second FAT stored in the external memory and determines whether there is update data in the external memory.

6. The terminal of claim 1, wherein upon determining that the update data is in the external memory, the controller creates a list of the update data and outputs the created list.

7. The terminal of claim 6, wherein the update data is modified or created by the information device among data stored in the external memory.

8. A method for verifying update data in an external memory in a mobile communication terminal, the method comprising:
   accessing data stored in the external memory, and updating a first FAT in the external memory according to the data access;
   creating and storing a second FAT having the same information as the updated first FAT, wherein the second FAT is only accessible by the mobile communication terminal;
   comparing the first FAT of the external memory with the second FAT; and
   determining that there is update data upon detecting an installation of the external memory,
   wherein the first FAT and the second FAT are separate data structures stored on the external memory.

9. The method of claim 8, further comprising:
   upon verifying that the update data is present, creating a list of the update data; and
   outputting the created list.

10. The method of claim 8, wherein the first FAT is accessible by all mobile communication systems and information equipment other than the mobile communication system.

11. The method of claim 10, wherein upon detection of a request for accessing the data stored in the external memory, the information equipment accesses the stored data and updates only information on the first FAT of the external memory.

12. The method of claim 10, wherein the update data is modified or created by the information equipment among data stored in the external memory.

13. The method of claim 8, wherein the second FAT is accessible only by the mobile communication system having created the second FAT.

14. A mobile communication terminal for identifying update data, the terminal comprising:
   a detachable external memory having a first File Allocation Table (FAT) which is accessible by the mobile communication terminal and an information device, and a second FAT which is only accessible by the mobile communication terminal,
   wherein the first FAT and the second FAT are separate data structures stored on the detachable external memory; and
   a controller for comparing information in the first FAT and the second FAT to identify the update data.

15. A method in a mobile communication terminal for identifying update data, the method comprising:
   identifying update data in a first File Allocation Table (FAT) in a detachable external memory which is accessible by the mobile communication terminal and an information device; and
   creating a second FAT which is only accessible by the mobile communication terminal in the detachable external memory, the second FAT having the same information as the first FAT,
   wherein the first FAT and the second FAT are separate data structures stored on the detachable external memory.

* * * * *